United States Patent Office
2,819,232
Patented Jan. 7, 1958

2,819,232

DITHIOPHOSPHATE COATING COMPOSITION AND PROCESS FOR PREPARING CELLULAR RESIN THEREFROM

James Herman Fortune, Springdale, Conn., assignor to American Cyanamid Company, New York, N. Y., a corporation of Maine No Drawing. Application March 1, 1954
Serial No. 413,433

10 Claims. (Cl. 260—2.5)

This invention relates to the production of plastics in a sponge-like or cellular form and particularly is concerned with the manufacture of gas expanded organoplastics, particularly linear polymers, copolymers and heteropolymers. More particularly, it relates to new organic chemical blowing agents capable of evolving gases upon heating of a mixture of the plastic and the blowing agent.

It is well known to use a number of organic chemical compounds as blowing agents for organoplastics. However, none are entirely satisfactory. It has been proposed to use $\alpha,\alpha'$-azobis(isobutyronitrile) and symmetrical xenyl-triazines as blowing agents but they are expensive to prepare and upon decomposition are rather toxic; the expanded organoplastic made therewith has an unpleasant odor. Diazoaminobenzene has also been used but it has been found to cause dermatitis on handling, discolors the blown product and the decomposition gases on blowing are very toxic. It has also been proposed to use hydrazides of organic sulfonic acids as blowing agents. These are quite expensive to prepare. They also discolor organoplastics, such as polyvinyl chloride polymers, polystyrene, etc., without the addition of certain acidic or alkaline additives. To the present there has been a demand for a chemical blowing agent especially suited for the expansion of organic plastics, such as linear polymers having little or no residual unsaturation and having unusual freedom from discoloring the product, having unusual ability for highly expanding the plastic, being readily stored and handled without decomposition or deterioration and with safety, producing uniform cellular structures and being stable under milling conditions so that they can be readily milled with the plastic at ordinary milling temperatures, and being readily and economically manufactured.

It is a principal object of the present invention to provide for a blowing agent which fulfills the demands of the art.

It is a further object of the invention to provide cellular materials of improved properties.

It is a still further object to provide for cellular organic structures of uniform cellular structure and fine texture being substantially free from discoloration.

According to the present invention it has been found that hydrocarbon substituted ammonium dithiophosphates adequately fulfill the present demand when incorporated into high molecular weight plastics. They act as excellent blowing agents for the manufacture of cellular organic materials. It is indeed surprising to utilize ammonium dithiophosphates as blowing agents since they are generally characterized as accelerators and promoters of oxidation. Compounds which are so characterized are generally avoided in that porous or cellular structures would not be realized. The successful use of ammonium dithiophosphates is therefore novel and unexpected.

In general, the objects of my invention can be easily accomplished by methods well known to the art. An ammonium dithiophosphate blowing agent is incorporated into an organoplastic. This mixture is heated to decompose the ammonium dithiophosphate to liberate gases evenly and smoothly throughout the composition. A cellular material of good color, uniform cell structure and fine texture is obtained. However, the blowing agents may be added, if desired, to a monomer prior to polymerization.

A good practice is to mix the plastic with the blowing agent while hot so as to rapidly effect dispersibility of the blowing agent in the plastic. Advantageously, there is no appreciable loss of gas during the hot mixing process. However, the incorporation of ammonium dithiophosphates into the plastic may take place at room temperature but its dispersibility in the plastic is generally lessened. Nonetheless in either mixing operation, the blowing agent of the invention decomposes at the processing temperatures to produce uniform cellular structure.

The ammonium dithiophosphates to be used as blowing agents are characterized by the formula:

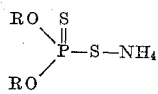

where R may be alkyl, from 1 to 18 carbon atoms, such as methyl, ethyl, isopropyl, cetyl, oleyl, butyl, 4-methyl-2-pentyl, octyl, decyl, dodecyl; monocyclic or polycyclic aryl such as phenyl, napthyl, biphenyl; aralkyl such as benzyl, phenethyl; and cycloalkyl such as cyclobutyl, cyclopentyl, and cyclohexyl.

The compounds are known as described in U. S. Patent No. 2,494,283 and can be readily and economically made by methods well known to the art. One such method is to react anhydrous ammonia with a mercaptan of the structure

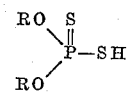

where R is as defined above. The reaction is carried out in an inert solvent, such as benzene or toluene.

As stated above, the class of blowing agents does not cause discoloration of these cellular materials. The decomposition products are physiologically satisfactory. Mixtures prepared with the blowing agents are stable on storage prior to blowing. The cellular materials prepared with ammonium dithiophosphates are substantially free from odor and are of uniform cellular structure. The size of the cells can, of course, be varied from coarse to fine pores of uniform size and with uniform results.

A variation in cell size, of course, depends on the amount of blowing agent added to the organic plastic material. Usually from about 0.1 to about 5.0 parts of blowing agent per 100 parts of material can be incorporated. A good range of blowing agent for obtaining medium sized cells is from about 2–3% of agent based on the weight of the organoplastic.

Examples of organoplastic materials which may be expanded in accordance with my invention are resins such as urea formaldehyde resins, phenolic resins, polymerized unsaturated materials such as polyacrylonitrile, polystyrene, polyvinylchloride, isocyanates, copolymers of vinyl chloride and vinyl acetate, amorphous non-resinous plastic materials such as cellulose esters, for example, cellulose acetate, cellulose acetate butyrate, cellulose ethers such as ethyl cellulose, etc. The organoplastic having little or no residual unsaturation may be of either the thermoplastic or thermosetting type, and it may be of a type of which polymerization is furthered or completed during the heating operation to generate gas.

The manipulative methods of treating the compositions to obtain the expanded products are all well known in the art. However, the temperatures which are employed for effecting decomposition of the ammonium dithiophosphates are within the range of about 140° C. to 200° C., and advantageously between about 160–180° C. Where temperatures below 140° C. are employed, the decomposition is too slow and incomplete. However, at temperatures above 200° C., the ammonium dithiophosphates tend to discolor the product. While the precise composition of the gases is not known, it is postulated without limitation thereto that the composition is nitrogen and/or ammonia.

The invention will be further illustrated by the following examples without being limited thereto. Except as otherwise noted all the parts in these examples are by weight.

Example 1

To a paste of 50 parts of tricresyl phosphate and 50 parts of polyvinyl chloride, 2.5 parts of ammonium bis-(4-methyl-2-pentyl)dithiophosphate as the blowing agent are added and intimately mixed together by milling on a two-roll mill at a temperature of 100°–115° C. for 15 minutes. A mold of suitable capacity is partially filled with this mixture. The mold is then tightly closed and heated at a temperature of 175° C. for 10 minutes. The mold is then water-cooled till room temperature is attained. The mold is then opened.

A light-weight, cellular expanded material of a very fine porous structure which is substantially devoid of discoloration is removed therefrom.

In this example, ammonium diethyl dithiophosphate is employed to replace the blowing agent above with the attainment of a similar result.

Example 2

100 parts of polystyrene which has been finely ground are intimately mixed in a ball mill at room temperature with 5.0 parts of ammonium dicyclohexyl dithiophosphate for 15 minutes. A mold of suitable capacity is partially filled with the mixture. The mold is then sealed and heated at a temperature of about 150° C. for 15 minutes. The mold is then cooled until room temperature is reached. The expanded product is then removed from the mold. The product is exposed to heated air at a temperature of 115° C.±5° C. for an additional 5 minutes. A light-weight expanded material of a uniform cellular structure is obtained.

In this example ammonium diphenyl dithiophosphate is used to replace the blowing agent with similar results.

Example 3

100 parts of cellulose acetate butyrate of 13.5% acetyl content and 36.5% butyryl content are intimately mixed with 12 parts of dibutyl sebacate and 3.0 parts of ammonium dicyclohexyl dithiophosphate on a two-roll mill at 125° C. for 10 minutes. The mix is then stripped from the roll. It is cooled to room temperature, granulated by usual methods, and the resulting granules are placed in a suitable mold which is partially filled. The mold is tightly sealed and heated to 160° C. for 10 minutes. The mold is thereafter water-cooled to room temperature. It is then opened. A uniform expanded cellular structure of excellent color and low gravity is removed therefrom.

Ammonium dibenzyl dithiophosphate is used to replace the blowing agent above.

Example 4

To a mixture of 30 parts of acrylonitrile monomer and 70 parts of styrene monomer is added 0.1 part of ammonium dicyclohexyl dithiophosphate as the blowing agent. The mixture is then introduced into a glass vessel. The latter is sealed and heated at 115° C. for 7 days to effect thermal polymerization. The polymer is then removed from the vessel, cooled and granulated; the resulting granules are placed in a suitable mold which is partially filled. The mold is tightly sealed and heated to 165° C. for 10 minutes. It is then cooled to room temperature and opened. A lightweight cellular expanded material of good color and very fine porous structure is removed therefrom.

Ammonium dioctyl dithiophosphate is employed to replace the blowing agent above to attain a similar lightweight cellular expanded material.

I claim:

1. The process of preparing a gas-expanded organoplastic composition which comprises the steps of: admixing an organoplastic material selected from the group consisting of urea formaldehyde resins, polyacrylonitrile, polystyrene, polyvinyl chloride, copolymers of vinyl chloride and vinyl acetate, cellulose esters and cellulose ethers and a small amount of from about 0.1% to about 5% of an ammonium dithiophosphate represented by the formula:

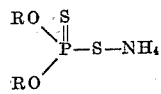

in which R is a radical selected from the group consisting of alkyl from 1–18 carbon atoms, aryl, aralkyl, and cycloalkyl; and heating said mixture to a temperature above the decomposition point of said ammonium dithiophosphate.

2. The process according to claim 1 in which the temperature of decomposition of said amonium dithiophosphate is from about 140° C.–200° C.

3. The process according to claim 1 in which the ammonium dithiophosphate is ammonium bis(4-methyl-2-pentyl)dithiophosphate.

4. The process according to claim 1 in which the ammonium dithiophosphate is ammonium dicyclohexyl dithiophosphate.

5. A compostion of matter capable of forming a cellular expanded material upon heating, consisting essentially of an organoplastic material selected from the group consisting of urea formaldehyde resins, polyacrylonitrile, polystyrene, polyvinyl chloride, copolymers of vinyl chloride and vinyl acetate, cellulose esters and cellulose ethers and a small amount of from about 0.1% to about 5.0% of an amonium dithiophosphate of the formula:

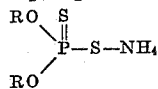

in which R is a radical selected from the group consisting of alkyl from 1–18 carbon atoms, aryl, aralkyl, and cycloalkyl.

6. A composition of matter according to claim 5 in which the organoplastic material is polyvinylchloride.

7. A composition of matter according to claim 5 in which the organoplastic material is polystyrene.

8. A composition of matter according to claim 5 in which the organoplastic material is cellulose acetate butyrate.

9. A composition of matter according to claim 5 in which the ammonium dithiophosphate is ammonium bis (4-methyl-2-pentyl)dithiophosphate.

10. A composition of matter according to claim 5 in which said ammonium dithiophosphate is ammonium dicyclohexyl dithiophosphate.

References Cited in the file of this patent

UNITED STATES PATENTS

| | | |
|---|---|---|
| 1,867,631 | Romieux et al. | July 19, 1932 |
| 2,206,284 | Jayne | July 2, 1940 |
| 2,386,995 | Wigal | Oct. 16, 1945 |

OTHER REFERENCES

Unicel N D, L. S. Bake, May 1947, Report No. 47–3, Rubber Chem. Division, E. I. du Pont de Nemours & Co., pages 1–4.